United States Patent
Zucca

[15] 3,695,630
[45] Oct. 3, 1972

[54] DEVICE FOR FACILITATING ATTACHMENT OF TRUCK CONVERTER AND TRAILER

[72] Inventor: Mark L. Zucca, 1608 Lafayette St., Alameda, Calif. 94501

[22] Filed: May 28, 1971

[21] Appl. No.: 147,791

[52] U.S. Cl. ..................280/474, 280/408, 280/476, 280/477
[51] Int. Cl. ...........................B62d 53/00, B60d 1/14
[58] Field of Search..............280/477, 474, 476, 408

[56] References Cited

UNITED STATES PATENTS

| | | | |
|---|---|---|---|
| 2,048,310 | 7/1936 | Wohldorf | 280/477 |
| 2,791,443 | 5/1957 | Allard | 280/477 |
| 2,826,432 | 3/1958 | Clever | 280/477 |
| 3,421,777 | 1/1969 | Barker et al. | 280/408 |
| 3,565,459 | 2/1971 | Reid | 280/477 |

FOREIGN PATENTS OR APPLICATIONS 602,520  9/1934  Germany..............280/478 R

*Primary Examiner*—Leo Friaglia
*Attorney*—Harris Zimmerman

[57] ABSTRACT

A device attached to a truck adjacent the hook or coupling thereof. The device is provided with a bottom wall and opposed side walls adapted to receive a portion of the tongue or draft bar of a truck converter adjacent the eye or socket of such bar. Means are provided for releasably securing the bar in said device whereby the converter is locked in said device with the bar substantially horizontal and without any lateral movement permitted therebetween, to facilitate movement of the truck and now attached converter into position with another trailer. In one embodiment of the invention, the device is pivotally attached to the truck and movable between a plurality of positions about a horizontal axis to facilitate the guiding of the bar eye into engagement with the coupling.

5 Claims, 6 Drawing Figures

PATENTED OCT 3 1972 3,695,630
SHEET 1 OF 2
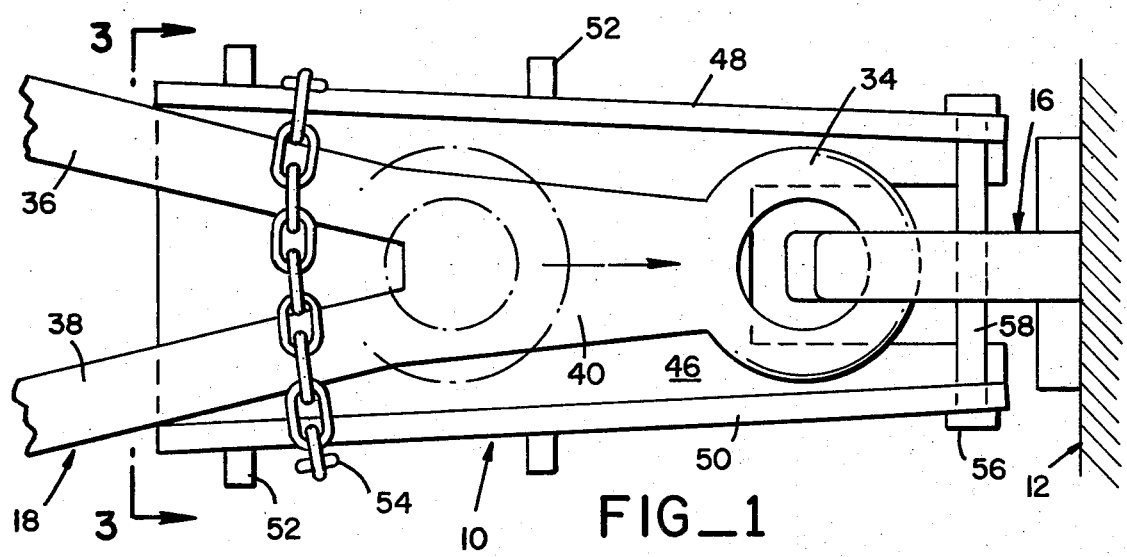
FIG_1
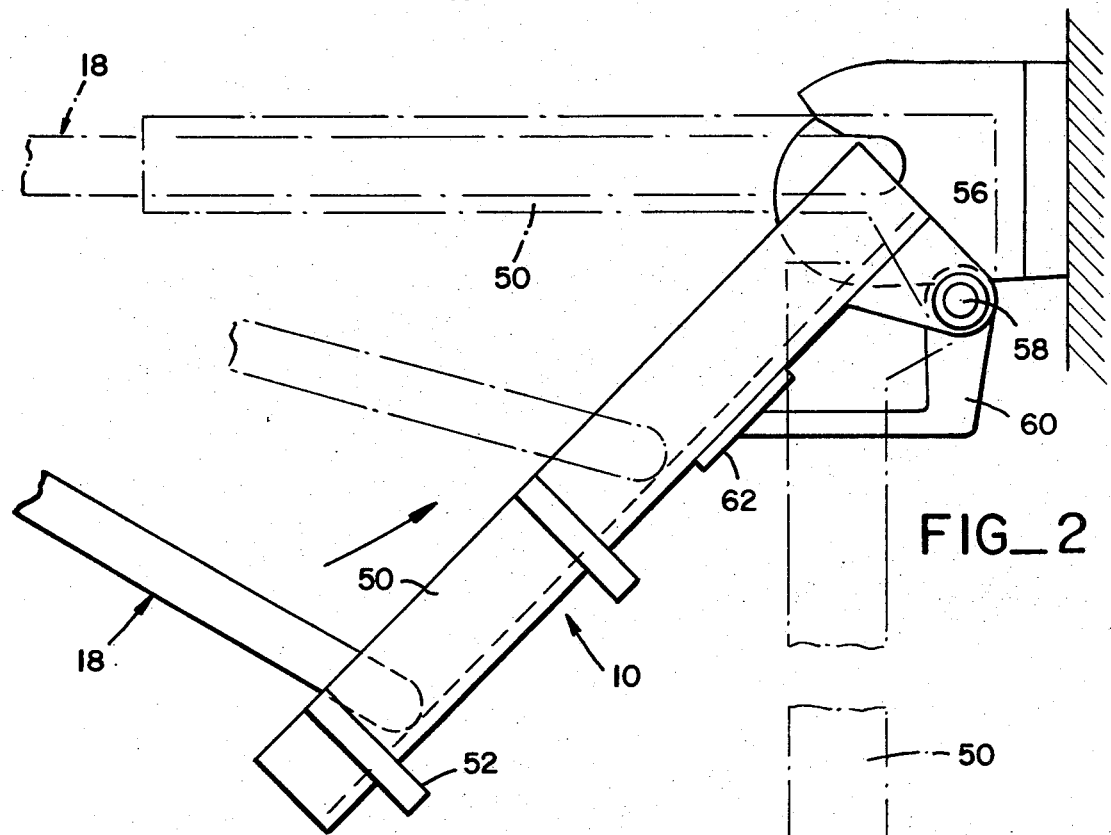
FIG_2
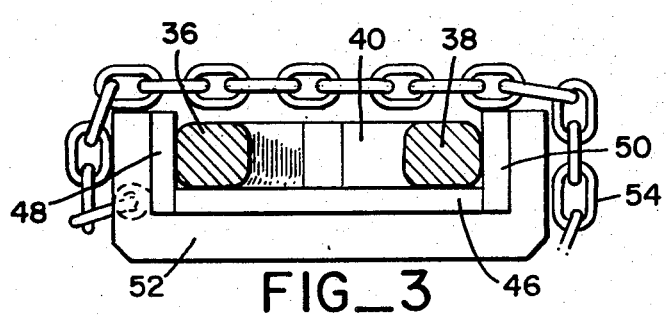
FIG_3
INVENTOR.
MARK L. ZUCCA
BY
Harris Zimmerman
ATTORNEY

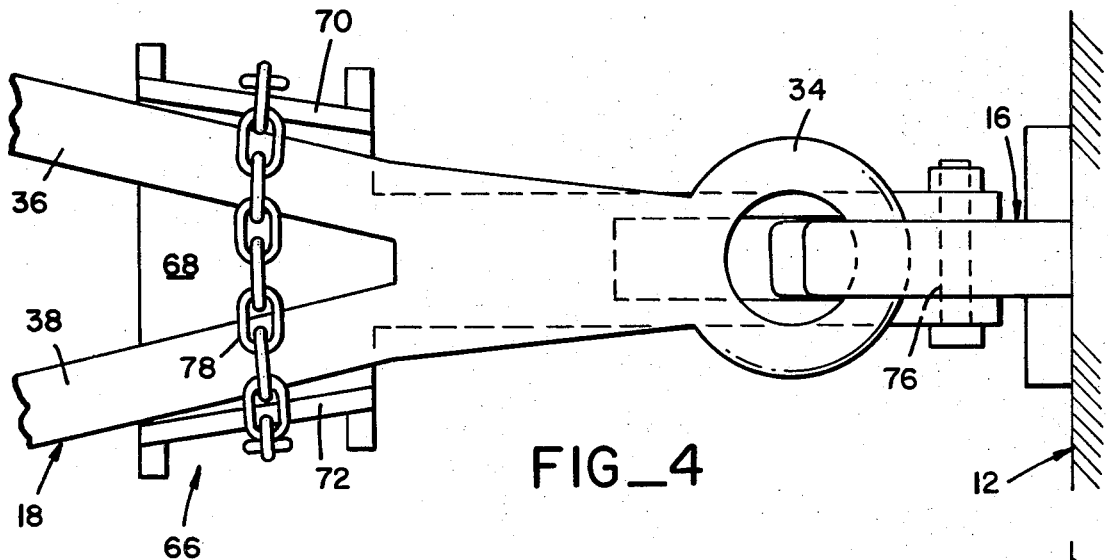
FIG_4
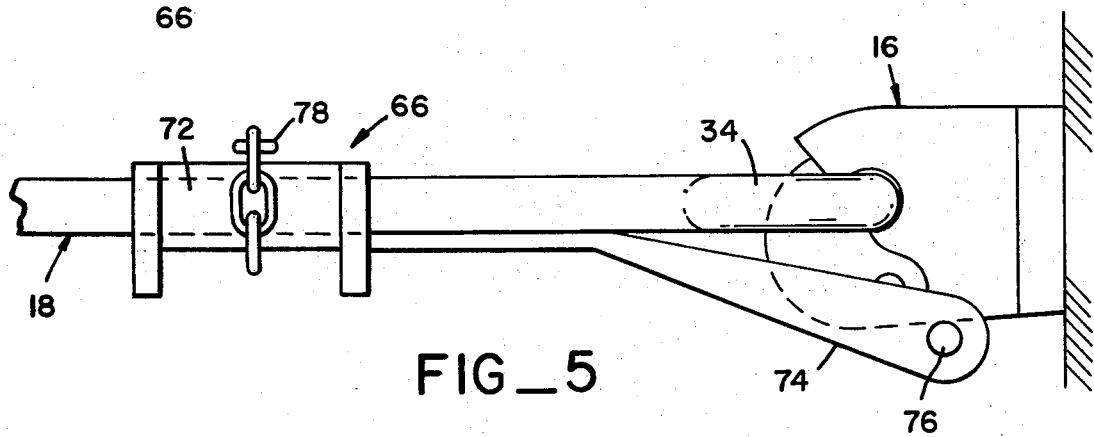
FIG_5
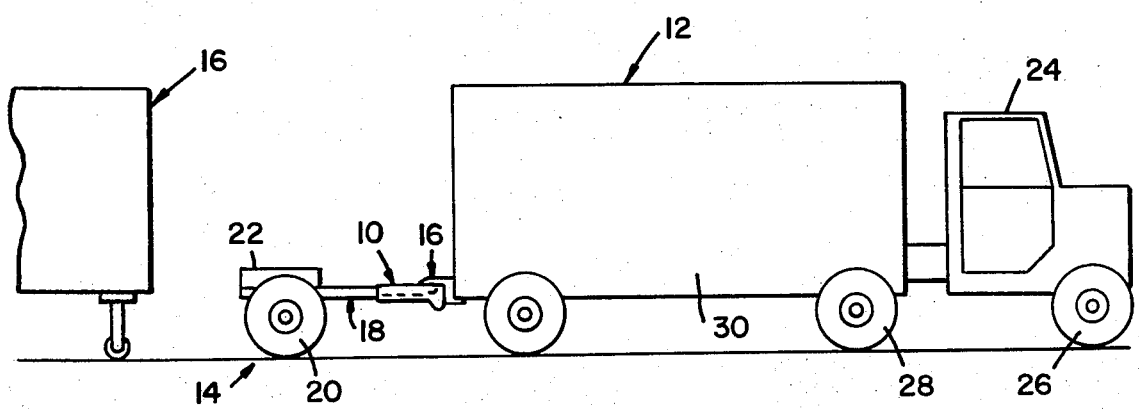
FIG_6
INVENTOR.
MARK L. ZUCCA
BY
Harris Zimmerman
ATTORNEY

DEVICE FOR FACILITATING ATTACHMENT OF TRUCK CONVERTER AND TRAILER

BACKGROUND OF THE INVENTION

In the trucking industry, truck converters are widely used. Basically, a truck converter consists of an axle carrying one or two wheels adjacent each end of the axle and a tongue or draft bar operatively attached to the axle, such bar usually being in the form of a yoke and having an eye or socket at the distal end thereof. When not in use, the end of such yoke rests on the ground.

As will be understood, when the converter is used, it is first necessary to attach the yoke to a suitable hook or coupling on the rear end portion of a truck, and the truck and attached converter is then backed into position to place the converter under the front end of a trailer which is then being supported by a so-called landing gear. After attachment of the converter to the trailer, the landing gear is raised, and the trailer is now supported on the converter and operatively connected to the truck.

The major problem encountered in the foregoing operation is in the proper positioning of the converter under the trailer after it has been attached to the truck. It is obvious that the draft bar connection to the truck coupling must permit lateral bar movement, and because of the nature of the converter structure, it is difficult to properly back up the truck with the converter aligned and in position under the trailer.

It is accordingly a primary object of the present invention to provide means for releasably locking the draft bar to the truck so as to prevent any lateral movement therebetween and whereby the truck and converter may readily be backed up for connection of the converter to the trailer.

THE DRAWINGS

FIG. 1 is a top plan view of the device of the present invention;

FIG. 2 is a side elevational view thereof;

FIG. 3 is a cross-sectional view taken in the plane 3—3 of FIG. 1;

FIG. 4 is a top plan view of another embodiment of the invention;

FIG. 5 is a side elevational view thereof; and

FIG. 6 is a side elevational view of a truck and attached converter adjacent a trailer to which the converter is to be attached.

DESCRIPTION

Before discussing the structural details of the present invention, reference is first made to FIG. 6 of the drawings wherein a device 10 is shown attached to the rear end portion of a truck assembly 12 and operatively connected to a truck converter 14, with the latter about to be backed into position under the front end of a trailer 16. As will be understood, the truck 12 is provided with a hook or coupling 16 adapted for releasable connection with the tongue or draft bar 18 of the converter. The converter is also provided with single or dual wheels 20 and an upper trailer supporting mechanism 22 which is adapted to underlie a portion of trailer 16 and support the latter. After the converter is attached to the trailer, the landing gear on which the front end portion of the trailer has been supported is raised, and the trailer is then operatively connected to the truck. No showing is made in the drawings of the various hydraulic or pneumatic hoses or lines which normally interconnect the trailer and truck, since they form no part of this invention. It should also be mentioned that when the term truck or truck assembly is used in the description or in the claims, such term is intended to include the type of arrangement illustrated in FIG. 6, wherein the same includes a truck cab 24 having front wheels 26 and rear wheels 28, the latter supporting and being connected to the front end portion of a trailer 30, similar to trailer 16 above discussed.

Reference is now made to FIGS. 1 to 3 of the drawings. Hook or coupling 16 extends rearwardly from the rear end portion of the truck 12, and as shown in FIG. 1, is intended for operative releasable engagement with an eye or socket 34 provided at the distal end of the bar 18. Such bar is normally in the form of a yoke, having rearwardly cornering legs 36,38 and terminating in an extension 40 in which the socket 34 is provided.

In accordance with conventional practice, the converter bar 18 when not in use will have the socket portion 34 resting on the ground. To use the same, the end of the converter is raised and manipulated into position until the socket is engaged with the coupling. In view of the fact that the connection between the socket and coupling must necessarily permit lateral movement therebetween, i.e., rotation of the draft bar 18 about a vertical axis, difficulty is encountered in backing up truck 12 and the attached converter into proper position relative to trailer 16. For this reason, it is not uncommon for the truck to be first driven slightly ahead of and aligned with the trailer, and the converter 14 manually moved from a remote location into alignment with the truck for connection therewith. Since the converters are heavy, considerable time and manual effort must be expended to perform this operation.

In accordance with the device 10 of the present invention, means are provided for releasably restraining the converter draft bar 18 against lateral motion after it is attached to the truck coupling so as to facilitate movement of the converter into proper aligned relationship with the trailer 16. After connection of the converter to the trailer, such means are released so that proper lateral pivotal movement is permitted between the truck and trailer.

As here shown, the device includes a bottom wall 46 and upstanding opposed side walls 48 and 50 with suitable transverse ribs 52 reinforcing such walls at longitudinally spaced portions thereof. The front end portion of the device is connected to the truck adjacent coupling 16 and when the device is in a horizontal operative position as shown in phantom lines of FIG. 2, the yoke extension 40 and socket portion 34 will be seated on bottom wall 46, and the opposed side walls will engage laterally opposed portions of bar 18 and thereby restrain any lateral pivotal movement between the device and the converter, and consequently between truck 12 and the converter. To releasably lock the bar 18 to the device, a chain 54 is secured to one of the side walls and the free end of the chain is thrown over the bar and releasably connected to the other side wall.

As a further feature of the present invention the device 10 is pivotally movable about a horizontal axis to facilitate guiding of the socket 34 into locking engagement with coupling 16. As here shown, the front end portion of the device is provided with opposed depending brackets 56 which are journalled on a horizontal shaft 58, the latter being mounted on the truck or on the coupling 16. The device may thus be moved from a first vertical position shown in dash-dot lines of FIG. 2 to the final operative horizontal position illustrated. It will be retained in the latter position after the bar socket is connected to the coupling and the chain 54 thrown over the bar. The device may also be moved to an intermediate position illustrated in solid lines in FIG. 2 and retained in such position by any suitable pivotally mounted prop member 60, pivotally carried on shaft 58, and having an angular configuration. The distal end of the prop 60 carries a pad 62 which engages the lower surface of bottom wall 46. Means, not shown, can releasably retain the prop in the position illustrated.

With the device in such angular disposition, the bottom wall 46 and side walls 48 and 50 serve as a guide for the socket end of the draw bar 18 to permit sliding of the socket up the effective ramp created thereby and into engagement with the coupling.

FIGS. 4 and 5 illustrate a somewhat modified form of the invention wherein a device 66 consists of a short bottom wall 68 and opposed side walls 70 and 72 spaced from the coupling 16. A bracket 74 pivotally attached by a shaft 76 adjacent coupling 16 permits movement of device 66 between a normal vertical inoperative position and the operative horizontal position shown in the drawings. Here again, a chain 78 is cast over the adjacent bar portion and connected to side walls 70 and 72 to hold the bar and device together, and again the side walls will restrain the bar against lateral pivotal movement.

In both embodiments, the side walls preferably converge towards the front end thereof, and in both instances, after the converter is connected to the trailer by the usual connecting mechanisms, the chain is released and the device is moved out of engagement with the converter bar.

I claim:

1. Apparatus of the character described including a member having a bottom wall and opposed side walls extending upwardly from opposed edge portions of said bottom wall, means mounting one end portion of said member to a truck assembly for pivotal movement only about a horizontal axis and movable between an operative horizontal position and an inoperative angularly related position, said member defining a recess for receiving a draft bar of a converter with portions of said bar disposed closely adjacent said side walls, and means releasably connecting said draft bar within said recess whereby said bar will be restrained against lateral pivotal movement.

2. Apparatus as set forth in claim 1 in which said truck assembly is provided with a coupling for attachment to the distal end of said draft bar, and said mounting means including a horizontal pivot positioned adjacent said coupling.

3. Apparatus as set forth in claim 1 in which said connecting means includes a flexible element having the ends thereof attachable to said side walls in overlying relation to the draft bar positioned therein.

4. Apparatus as set forth in claim 1 in which said side walls converge towards said one end portion thereof.

5. Apparatus as set forth in claim 1 in which a prop element is provided for releasably retaining said member in a position intermediate said horizontal position and a vertical position.

* * * * *